United States Patent
Lyons et al.

(10) Patent No.: US 12,378,634 B2
(45) Date of Patent: Aug. 5, 2025

(54) SYSTEMS AND METHODS FOR IMPROVED RAFFINATE INJECTION

(71) Applicant: FREEPORT MINERALS CORPORATION, Phoenix, AZ (US)

(72) Inventors: Sarah Lyons, Vail, AZ (US); Joanna M. Robertson, Thatcher, AZ (US); Casey J. Clayton, Ariquipa (PE); Richard Melecio Sanchez, Central, AZ (US); Raquel Crossman, Mesa, AZ (US); Luciano Kiniti Issoe, Sao Palo (BR); Tianfang Ni, Boston, MA (US); Oleksandr Klesov, Lexington, MA (US); Luke Gerdes, Framingham, MA (US); Muneeb Alam, Alexandria, VA (US); Chase Zenner, Tucson, AZ (US); John Warren Dean, Jr., Thatcher, AZ (US)

(73) Assignee: FREEPORT MINERALS CORPORATION, Phoenix, AZ (US)

( * ) Notice: Subject to any disclaimer, the term of this patent is extended or adjusted under 35 U.S.C. 154(b) by 71 days.

(21) Appl. No.: 18/480,377

(22) Filed: Oct. 3, 2023

(65) Prior Publication Data
US 2024/0026493 A1 Jan. 25, 2024

Related U.S. Application Data

(63) Continuation-in-part of application No. 17/945,451, filed on Sep. 15, 2022, now Pat. No. 12,018,349, and
(Continued)

(51) Int. Cl.
C22B 7/00 (2006.01)
C22B 3/02 (2006.01)
(Continued)

(52) U.S. Cl.
CPC ............ C22B 7/007 (2013.01); C22B 3/04 (2013.01); C22B 15/0065 (2013.01);
(Continued)

(58) Field of Classification Search
CPC ........... C22B 3/06; C22B 11/00; C22B 11/04; C22B 15/00; C22B 15/0067;
(Continued)

(56) References Cited

U.S. PATENT DOCUMENTS

| | | |
|---|---|---|
| 3,587,620 A | 6/1971 | Berthold |
| 3,993,293 A | 11/1976 | Mukae et al. |

(Continued)

FOREIGN PATENT DOCUMENTS

| | | |
|---|---|---|
| CA | 1156049 | 11/1983 |
| CN | 101871049 | 10/2010 |
| CN | 111996373 | 11/2020 |
| GB | 1404243 | 8/1975 |
| WO | WO9808585 | 3/1998 |

OTHER PUBLICATIONS

USPTO Notice of Allowance from U.S. Appl. No. 17/945,451 dated Mar. 19, 2024.
(Continued)

*Primary Examiner* — William M McCalister
(74) *Attorney, Agent, or Firm* — SNELL & WILMER L.L.P.

(57) ABSTRACT

The present disclosure provides a method comprising determining an ore map for a heap to identify a location of a recoverable metal-bearing material in the heap, wherein the metal-bearing material comprises iron and at least one other metal value, delivering a leaching solution from a leaching solution source to a leaching solution regulating system, wherein the leaching solution comprises an effective amount of citric acid and hydrogen peroxide, regulating at least one of a pressure, a mass flow rate, or a volumetric flow rate of the leaching solution to achieve a target operational condi-
(Continued)

tion, wherein the target operational condition is selected to optimize a set of operational parameters to maximize recovery of the at least one other metal value, delivering the leaching solution at the target operational condition from the leaching solution regulating system to the subsurface leaching distribution system, and delivering the leaching solution at the target operational condition from the subsurface leaching distribution system to the location of the recoverable metal-bearing material under a surface of the heap to leach and recover the at least one other metal value.

20 Claims, 4 Drawing Sheets

Related U.S. Application Data a continuation-in-part of application No. 18/124,333, filed on Mar. 21, 2023, which is a continuation of application No. 17/733,171, filed on Apr. 29, 2022, now Pat. No. 11,639,539, which is a continuation of application No. 17/223,404, filed on Apr. 6, 2021, now Pat. No. 11,332,808, which is a continuation of application No. 16/223,760, filed on Dec. 18, 2018, now Pat. No. 10,975,455, which is a continuation of application No. 15/989,614, filed on May 25, 2018, now Pat. No. 10,190,190, which is a continuation of application No. 15/539,328, filed as application No. PCT/US2015/050015 on Sep. 14, 2015, now Pat. No. 9,982,321.

(60) Provisional application No. 63/246,046, filed on Sep. 20, 2021, provisional application No. 62/097,458, filed on Dec. 29, 2014.

(51) Int. Cl.
| | | |
|---|---|---|
| *C22B 3/04* | (2006.01) | |
| *C22B 3/22* | (2006.01) | |
| *C22B 3/44* | (2006.01) | |
| *C22B 15/00* | (2006.01) | |
| *E21B 43/28* | (2006.01) | |
| *G01F 1/36* | (2006.01) | |
| *G01F 1/42* | (2006.01) | |
| *G01F 15/00* | (2006.01) | |
| *G01F 15/06* | (2022.01) | |
| *G05D 16/10* | (2006.01) | |
| *G05D 16/20* | (2006.01) | |
| *G08B 21/18* | (2006.01) | |
| *G01F 1/34* | (2006.01) | |
| *G01F 1/74* | (2006.01) | |

(52) U.S. Cl.
CPC ............... *G01F 1/363* (2013.01); *G01F 1/42* (2013.01); *G01F 15/003* (2013.01); *G01F 15/005* (2013.01); *G01F 15/066* (2013.01); *G05D 16/20* (2013.01); *G08B 21/182* (2013.01); *C22B 3/02* (2013.01); *C22B 3/22* (2013.01); *C22B 3/44* (2013.01); *E21B 43/28* (2013.01); *G01F 1/34* (2013.01); *G01F 1/74* (2013.01); *G01F 15/006* (2013.01); *G05D 16/101* (2019.01); *G05D 16/2024* (2019.01); *Y02P 10/20* (2015.11); *Y10T 137/86574* (2015.04)

(58) Field of Classification Search
CPC ..... C22B 15/0095; C22B 19/00; C22B 19/22; C22B 23/00; C22B 23/0415; C22B 30/02; C22B 30/04; C22B 41/00; C22B 59/00; C22B 60/02; C22B 60/0226; C22B 61/00; C22B 3/02; C22B 3/04; C22B 3/22; C22B 3/44; C22B 7/00; G06Q 10/04; G06Q 10/0631; G06Q 10/50/02; G05D 16/10; G05D 16/20; E21B 43/28; G01F 1/363; G01F 1/42; G01F 15/006; G01F 15/003; G01F 15/005; G01F 15/066
See application file for complete search history.

(56) References Cited

U.S. PATENT DOCUMENTS

| | | | |
|---|---|---|---|
| 4,045,084 A | 8/1977 | Hsueh et al. | |
| 4,093,526 A | 6/1978 | Blanco et al. | |
| 4,168,295 A | 9/1979 | Sawyer | |
| 4,175,789 A | 11/1979 | Kube et al. | |
| 4,180,088 A | 12/1979 | Mallett | |
| 4,369,100 A | 1/1983 | Sawyer | |
| 4,739,973 A | 4/1988 | Herndon | |
| 4,807,854 A | 2/1989 | Mitchell | |
| 4,974,816 A | 12/1990 | Emmett, Jr. et al. | |
| 5,313,982 A | 5/1994 | Ohmi et al. | |
| 5,329,463 A | 7/1994 | Sierk et al. | |
| 5,598,838 A | 2/1997 | Servidio et al. | |
| 6,030,048 A | 2/2000 | Hsu | |
| 6,395,061 B1 | 5/2002 | Duyvesteyn et al. | |
| 6,498,031 B1 | 12/2002 | Carter | |
| 8,388,729 B2 | 3/2013 | Welham et al. | |
| 9,181,603 B2 | 11/2015 | Boudreault et al. | |
| 9,945,009 B2 | 4/2018 | Boudreault et al. | |
| 9,982,321 B2 | 5/2018 | Dean, Jr. et al. | |
| 10,190,190 B2 | 1/2019 | Dean, Jr. et al. | |
| 10,344,353 B2 | 7/2019 | Mujicic et al. | |
| 10,975,455 B2 | 4/2021 | Dean, Jr. et al. | |
| 11,332,808 B2 | 5/2022 | Dean, Jr. et al. | |
| 11,521,138 B1 * | 12/2022 | Geislinger | C22B 15/0071 |
| 11,639,539 B2 | 5/2023 | Dean, Jr. et al. | |
| 2002/0179451 A1 | 12/2002 | Weldon et al. | |
| 2004/0113333 A1 | 6/2004 | Podznoev et al. | |
| 2004/0173057 A1 * | 9/2004 | Fairbourn | C22B 3/02 |
| | | | 75/743 |
| 2005/0016593 A1 | 1/2005 | Ephrat et al. | |
| 2006/0054214 A1 | 3/2006 | Caamano et al. | |
| 2008/0102514 A1 | 5/2008 | Coallao Olivares et al. | |
| 2008/0210017 A1 | 9/2008 | Igarashi et al. | |
| 2008/0286180 A1 | 11/2008 | Jones | |
| 2009/0087892 A1 * | 4/2009 | Champion | C12P 3/00 |
| | | | 435/441 |
| 2009/0230207 A1 | 9/2009 | Guzman et al. | |
| 2009/0293679 A1 | 12/2009 | Singh et al. | |
| 2011/0178644 A1 | 7/2011 | Picton | |
| 2011/0286542 A1 | 11/2011 | Shelburne | |
| 2011/0303051 A1 | 12/2011 | Gonzalez et al. | |
| 2012/0161374 A1 | 6/2012 | Nakai et al. | |
| 2012/0297928 A1 | 11/2012 | Lang et al. | |
| 2013/0008856 A1 | 1/2013 | Megaw | |
| 2013/0032737 A1 | 2/2013 | Neilson et al. | |
| 2014/0369904 A1 | 12/2014 | Boudreault et al. | |
| 2014/0369907 A1 | 12/2014 | Boudreault et al. | |
| 2015/0225808 A1 | 8/2015 | Boudreault et al. | |
| 2017/0356065 A1 * | 12/2017 | Dean, Jr. | G05D 16/20 |
| 2018/0274057 A1 | 9/2018 | Dean, Jr. et al. | |
| 2019/0119781 A1 | 4/2019 | Dean, Jr. et al. | |
| 2019/0356065 A1 | 11/2019 | Watkins et al. | |
| 2020/0224290 A1 | 7/2020 | Oraby et al. | |
| 2020/0340077 A1 * | 10/2020 | Lizama | E21B 34/02 |
| 2021/0238708 A1 | 8/2021 | Dean, Jr. et al. | |
| 2022/0259695 A1 | 8/2022 | Dean, Jr. et al. | |
| 2023/0090475 A1 | 3/2023 | Lyons | |
| 2023/0227934 A1 | 7/2023 | Dean, Jr. et al. | |
| 2024/0026492 A1 | 1/2024 | Clayton et al. | |

OTHER PUBLICATIONS

International Preliminary Report on Patentablility from PCT/US2022/043625 dated Mar. 26, 2024.

(56) References Cited

OTHER PUBLICATIONS

International Search Report and Written Opinion dated Jan. 19, 2016 from corresponding International Application PCT/US2015/050015.
International Preliminary Report on Patentability dated Feb. 3, 2017 from corresponding International Application PCT/US2015/050015.
Notice of Allowance and Examiner's Amendment from U.S. Appl. No. 15/539,328 dated Jan. 30, 2018.
Supplemental Notice of Allowability from U.S. Appl. No. 15/539,328 dated Apr. 26, 2018.
Notice of Allowance and Examiner's Amendment from U.S. Appl. No. 15/989,614 dated Sep. 27, 2018.
Examination Report dated Dec. 10, 2018 from corresponding Chilean Patent Application No. 2017-01732 with machine translation of same in English.
Non-Final Office Action from U.S. Appl. No. 16/223,760 dated Jan. 16, 2020.
Non-Final Office Action from U.S. Appl. No. 16/223,760 dated Aug. 7, 2020.
Notice of Allowance and Examiner's Interview Summary from U.S. Appl. No. 16/223,760 dated Dec. 23, 2020.
Notice of Allowance and Examiner's Interview Summary from U.S. Appl. No. 17/223,404 dated Jan. 25, 2022.
Non-Final Office Action from U.S. Appl. No. 17/733,171 dated Nov. 9, 2022.
Notice of Allowance and Examiner's Interview Summary from U.S. Appl. No. 17/733,171 dated Dec. 21, 2022.
Stuurman, S., S. Ndlovu, and V. Sibanda. "Comparing the extent of the dissolution of copper-cobalt ores from the DRC Region." Journal of the Southern African Institute of Mining and Metallurgy 114.4 (2014): 347-349.
Jadhav, Umesh, C. Su, and Hong Hocheng. "Leaching of metals from large pieces of printed circuit boards using citric acid and hydrogen peroxide." Environmental Science and Pollution Research 23.23 (2016): 24384-24392.
Kokes, H., M. H. Morcali, and E. Acma. "Dissolution of copper and iron from malachite ore and precipitation of copper sulfate pentahydrate by chemical process." Engineering Science and Technology, an International Journal 17.1 (2014): 39-44.
Biswas, S., and A. F. Mulaba-Bafubiandi. "Extraction of Copper and Cobalt from Oxidized Ore using Organic Acids." Hydrometallurgy Conference. 2016.
Yazici, Ersin Yener. "Improvement of stability of hydrogen peroxide using ethylene glycol." Journal of Science and Engineering 19.57 (2017).
Mahajan, V., et al. "Enhanced leaching of copper from chalcopyrite in hydrogen peroxide-glycol system." Minerals Engineering 20.7 (2007): 670-674.
Gargul, K., et al. "Leaching of lead and copper from flash smelting slag by citric acid." Archives of Civil and Mechanical Engineering 19 (2019): 648-656.
Shabani, M. A., M. Irannajad, and A. R. Azadmehr. "Investigation on leaching of malachite by citric acid." International Journal of Minerals, Metallurgy, and Materials 19.9 (2012): 782-786.
Haas, Larry A., and Terry L. Hebble. "Influence of Chelating Reagents on Leaching of Copper Ore" vol. 8965. US Department of the Interior, Bureau of Mines, 1985.
PCT Notification of Transmittal of the International Search Report and the Written Opinion of the International Searching Authority, or the Declaration from PCT/US2022/043625 dated Jan. 6, 2023.
USPTO Non-Final Office Action from U.S. Appl. No. 17/945,451 dated Jun. 23, 2023.
Salas-Martell et al., Leaching of pyrite-based ore containing copper using sulfuric acid and hydrogen peroxide, international Journal of Industrial Chemistry, 11:195-291, Jun. 2020 (Year: 2020).
CN-101871049-A English translation.
PCT International Search Report and Written Opinion of the International Searching Authority in PCT/US2024/049548 dated Dec. 10, 2024.
PCT International Search Report and Written Opinion of the International Searching Authority in PCT/US2024/049581 dated Dec. 18, 2024.
Reply to Written Opinion, PCT Demand and Letter Accompanying Article 19 Amendments in PCT/US2024/049548 dated Dec. 23, 2024.
Reply to Written Opinion, PCT Demand and Letter Accompanying Article 19 Amendments in PCT/US2024/049581 dated Feb. 14, 2025.
PCT International Preliminary Report on Patentability in PCT/US2024/049548 dated Feb. 27, 2025.
PCT Corrected International Preliminary Report on Patentability in PCT/US2024/049581 dated Mar. 20, 2025.
USPTO Non Final Office Action in U.S. Appl. No. 18/480,354 dated Mar. 10, 2025.
Response to Non Final Office Action in U.S. Appl. No. 18/480,354 dated Apr. 2, 2025.

\* cited by examiner

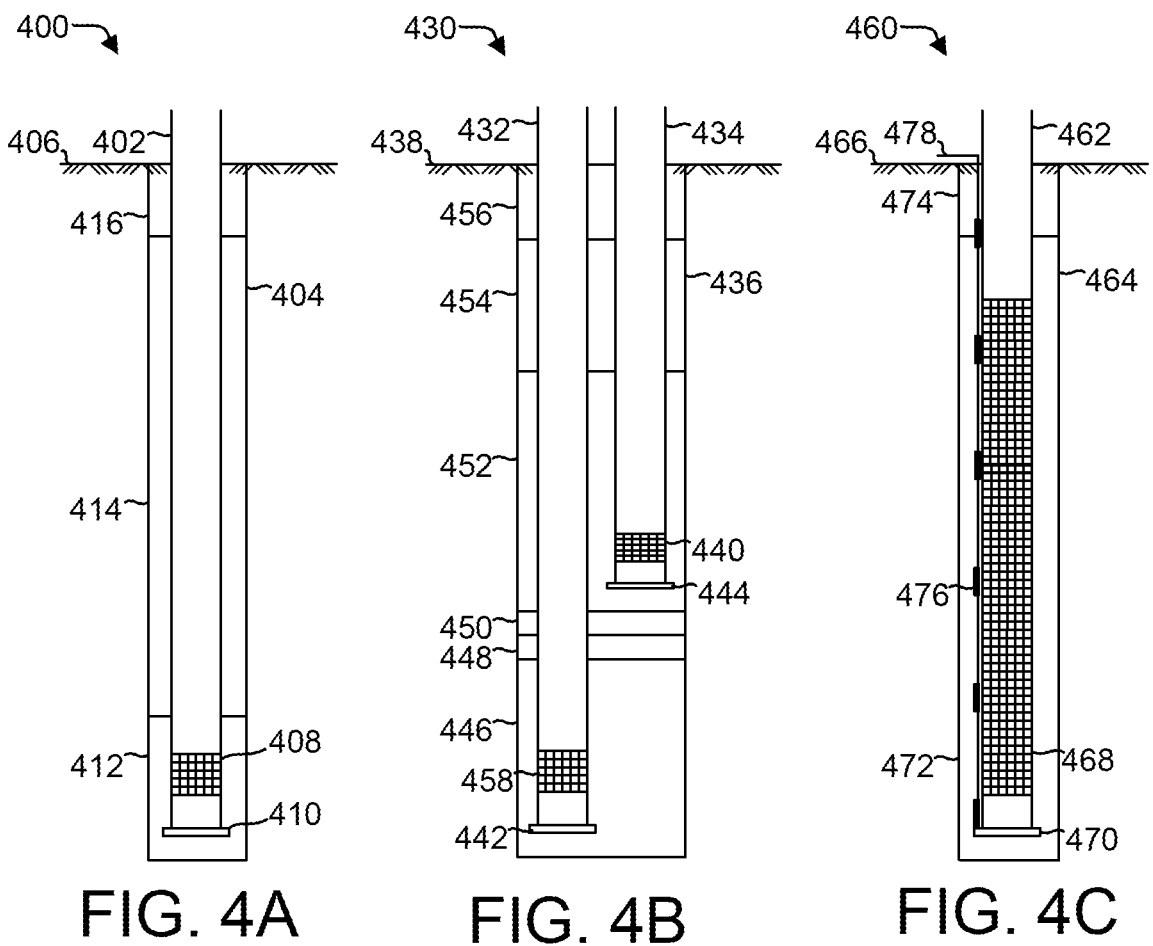

SYSTEMS AND METHODS FOR IMPROVED RAFFINATE INJECTION

CROSS-REFERENCE TO RELATED APPLICATIONS

This application is a continuation-in-part of and claims priority to U.S. patent application Ser. No. 17/945,451, entitled "METHODS AND SYSTEMS FOR LEACHING A METAL-BEARING MATERIAL," which was filed on Sep. 15, 2022 (the "'451 application") and claims priority to U.S. Provisional Patent Application Ser. No. 63/246,046, filed on Sep. 20, 2021. This application is a continuation-in-part of and claims priority to U.S. patent application Ser. No. 18/124,333, entitled "SYSTEMS AND METHODS FOR MONITORING METAL RECOVERY SYSTEMS," which was filed on Mar. 21, 2023 (the "'333 application"). The '333 application is a continuation of and claims priority to U.S. patent application Ser. No. 17/733,171, entitled "SYSTEMS AND METHODS FOR MONITORING METAL RECOVERY SYSTEMS," which was filed on Apr. 29, 2022, now U.S. Pat. No. 11,639,539, issued on May 2, 2023 (the "'171 application"). The '171 application is a continuation of and claims priority to U.S. patent application Ser. No. 17/223,404, entitled "SYSTEMS AND METHODS FOR MONITORING METAL RECOVERY SYSTEMS," which was filed on Apr. 6, 2021, now U.S. Pat. No. 11,332,808, issued on May 17, 2022 (the "'404 application"). The '404 application is a continuation of and claims priority to U.S. patent application Ser. No. 16/223,760, entitled "SYSTEMS AND METHODS FOR MONITORING METAL RECOVERY SYSTEMS," which was filed on Dec. 18, 2018, now U.S. Pat. No. 10,975,455, issued on Apr. 13, 2021 (the "'760 application"). The '760 application is a continuation of and claims priority to U.S. patent application Ser. No. 15/989,614, entitled "SYSTEMS AND METHODS FOR MONITORING METAL RECOVERY SYSTEMS," which was filed on May 25, 2018, now U.S. Pat. No. 10,190,190, issued on Jan. 29, 2019 (the "'614 application"). The '614 application is a continuation of and claims priority to U.S. patent application Ser. No. 15/539,328, entitled "SYSTEMS AND METHODS FOR MONITORING METAL RECOVERY SYSTEMS," which was filed on Jun. 23, 2017, now U.S. Pat. No. 9,982,321, issued on May 29, 2018 (the "'328 application"). The '328 application is a U.S. National Phase filing under 35 U.S.C § 371 of and claims priority to PCT/US2015/050015, filed on Sep. 14, 2015, which claims priority to U.S. Provisional Patent Application Ser. No. 62/097,458, filed on Dec. 29, 2014. The aforementioned applications are hereby incorporated by reference herein in their entireties.

FIELD OF THE DISCLOSURE

The present disclosure relates, generally, to systems and methods for monitoring and/or regulating subsurface metal recovery systems, and more specifically, to systems and methods for introducing additive enhanced and oxygenated leaching solution under the surface of a heap at a target operational condition to target areas of residual copper and improve leaching conditions of the heap.

BACKGROUND OF THE DISCLOSURE

Hydrometallurgical treatment of metal bearing materials, such as copper ores, copper concentrates, and other metal bearing ores and concentrates, has been well established for many years. Typically, conventional hydrometallurgical processes for copper recovery involve leaching metal bearing materials with an acidic solution, for example, either atmospherically or under conditions of elevated temperature and pressure. The resultant process stream—the pregnant leach solution—is recovered, and a processing step such as solution extraction is used to form a highly concentrated and relatively pure metal value containing aqueous phase. One or more metal values may then be electrowon from this aqueous phase.

Leaching under atmospheric conditions in a conventional heap leaching operation may comprise placing an acidic leaching solution onto the surface of a collection of ore referred to as a heap to liberate metal values from the ore. Heap leaching may thus involve the use of a leaching solution distribution system, which is typically a large network of pipes or other conduits. The pipes or other conduits may have nozzles or other orifices that are designed to emit leaching solution at a particular flow condition.

Typically, leaching solution is distributed on top of the heap and, by force of gravity, travels down towards the pad. The pad may be sloped toward a collection pipe or conduit for recovering the pregnant leach solution. Conventional surface heap leaching operations may be unable to liberate certain metal values from the ore as a result of low permeable materials such as high clay content materials present in the heap. Such low permeable materials may prevent percolation of the leaching solution through portions of the heap, thereby preventing contact of the ore with the leaching solution in these portions, ultimately resulting in metal values remaining unliberated in the heap.

Additionally, heap permeability is commonly further impacted by the precipitation of compounds from leach solutions. One such compound, jarosite, results from the precipitation of ferric iron in combination with other ions. Jarosite precipitates directly onto the surface of the mineral in a process known as passivation, creating a film that covers the mineral and prevents the leach solution from contacting the surface. As such, the precipitation of jarosite hinders metal recovery through passivation and by creating areas of low permeability in the heap.

Further, existing subsurface systems may lack the ability to regulate flow conditions of the leaching solution, for example, pressure, mass flow rate, and volumetric flow rate, which may be important factors in determining subsurface leaching efficiency and effectiveness. Targeted and controlled subsurface delivery of leaching solutions is important in order to optimize the economics of subsurface leaching. For example, leach heaps are non-homogenous due to the fact that the ore comes from multiple locations in the ore body. This results in a wide variation in minerology and leaching characteristics throughout the heap. Thus, when the ore was originally leached via surface leaching, the copper placed in some locations may have leached to near completion, while the copper placed in other locations did not leach well due to a variety of factors, including mineralogy, heap permeability, and lixiviant chemistry.

Various attempts have been made to improve the process, such as, for example, in Guzman et al., "Hybrid Integration System", U.S. Pat. No. 8,186,607. This patent proposed using a combined surface and subsurface leaching system to improve surface ponding and heap stability through the use of solution delivered at a set operating pressure based on the heap's hydraulic properties. However, by primarily focusing on maintaining heap stability and improving safety through hydraulic controls, several other pertinent operational factors are not taken into account when determining optimal leaching conditions. Therefore, it is not possible to maximize recovery using this process.

This invention utilizes pressure, flow, and volume control through a subsurface leaching distribution system combined with residual metal mapping to identify ore targets and apply additive-enhanced solutions of targeted chemistry to exact locations and depths within leach heaps at a target operational condition to maximize recovery.

SUMMARY OF THE DISCLOSURE

A method may comprise determining an ore map for a heap to identify a location of a recoverable metal-bearing material in the heap, wherein the metal-bearing material comprises iron and at least one other metal value, delivering a leaching solution from a leaching solution source to a leaching solution regulating system, wherein the leaching solution comprises an effective amount of citric acid and hydrogen peroxide, regulating at least one of a pressure, a mass flow rate, or a volumetric flow rate of the leaching solution to achieve a first target operational condition, wherein the first target operational condition is selected to optimize a set of operational parameters to maximize recovery of the at least one other metal value, delivering the leaching solution at the first target operational condition from the leaching solution regulating system to the subsurface leaching distribution system, and delivering the leaching solution at the first target operational condition to the location of the recoverable metal-bearing material under a surface of the heap to leach and recover the at least one other metal value. In various embodiments, the effective amount of citric acid is about 1 g/L to about 10 g/L and wherein the effective amount of hydrogen peroxide is about 0.5% to about 10% by weight.

In various embodiments, the leaching solution regulating system may comprise a plurality of leaching solution regulating modules. Each leaching solution regulating module may comprise a meter configured to detect a pressure or flow rate of the leaching solution. Each leaching solution regulating module may comprise a regulator configured to set a pressure or flow rate of the leaching solution to the target operational condition. In various embodiments, the metal-bearing material is chalcopyrite. Each leaching solution regulating module may comprise a transmitter configured to transmit a pressure or flow rate of the leaching solution. In various embodiments, the set of operational parameters comprises at least one of minerology, chemistry, permeability, and remaining recoverable metal values.

In various embodiments, determining the ore map may comprise adding flow data, irrigation data, and a remaining mineral prediction from a machine learning model to obtain information by section and by date for the heap. In various embodiments, the method may further comprise determining x,y,z coordinates for the location of recoverable metal-bearing material in the heap.

In various embodiments, the method may further comprise treating the location of the recoverable metal-bearing material to render the area susceptible to further leaching, wherein the treating comprises delivering a treatment solution to the location of the recoverable metal-value material, and wherein the treatment solution comprises citric acid.

An exemplary system may comprise a recoverable metal-bearing material in a heap, wherein the recoverable metal-bearing material comprises iron and at least one other metal value, a leaching solution regulating system configured to regulate a flow of leaching solution to a target operational condition, wherein the leaching solution comprises an effective amount of citric acid and hydrogen peroxide, and wherein the target operational condition is selected to optimize a set of operational parameters to maximize recovery of the at least one other metal value, and a subsurface leaching solution distribution system fluidly coupled to the leaching solution regulating system, the subsurface leaching solution distribution system comprising a subsurface injector configured to deliver leaching solution under a surface of a heap to leach one or more metal values. In various embodiments, the subsurface injector is further configured to deliver a treatment solution to the at least one location of the recoverable metal-bearing material to render the at least one location susceptible to further leaching, wherein the treatment solution comprises citric acid.

The subsurface injector may be inserted into a bore formed in the heap, the bore filled with at least one material configured to provide stability and sealing for the subsurface injector. The system may further comprise a plurality of sensors distributed along a length of the subsurface injector.

In various embodiments, the effective amount of citric acid is about 1 g/L to about 10 g/L and wherein the effective amount of hydrogen peroxide is about 0.5% to about 10% by weight. In various embodiments, the metal-bearing material is chalcopyrite. In various embodiments, the at least one other metal value comprises copper, nickel, zinc, silver, gold, germanium, lead, arsenic, antimony, chromium, molybdenum, rhenium, tungsten, iron, ruthenium, osmium, cobalt, rhodium, iridium, palladium, platinum, uranium, or rare earth metals.

In various embodiments, the system may further comprise an ore map determined by adding flow data, irrigation data and a remaining mineral prediction from a machine learning model to obtain information by section and by date for the heap. In various embodiments, the at least one location of the recoverable metal-bearing material in the heap is in x,y,z coordinates of the heap. In various embodiments, the set of operational parameters comprises at least one of minerology, chemistry, permeability, and remaining recoverable metal values.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present invention is particularly pointed out and distinctly claimed in the concluding portion of this specification. A more complete understanding of the present invention, however, may best be obtained by referring to the detailed description and claims when considered in connection with the drawing figures, wherein like numerals denote like elements and wherein:

FIG. 4A is a diagram illustrating a single injection well design of a subsurface leaching solution distribution system in accordance with various embodiments of the present disclosure;

FIG. 4B is a diagram illustrating a nested injection well design of a subsurface leaching solution distribution system in accordance with various embodiments of the present disclosure; and FIG. 4C is a diagram illustrating an injection well design of a subsurface leaching solution distribution system including one or more monitoring electrodes in accordance with various embodiments of the present disclosure.

DETAILED DESCRIPTION

Figure 1:
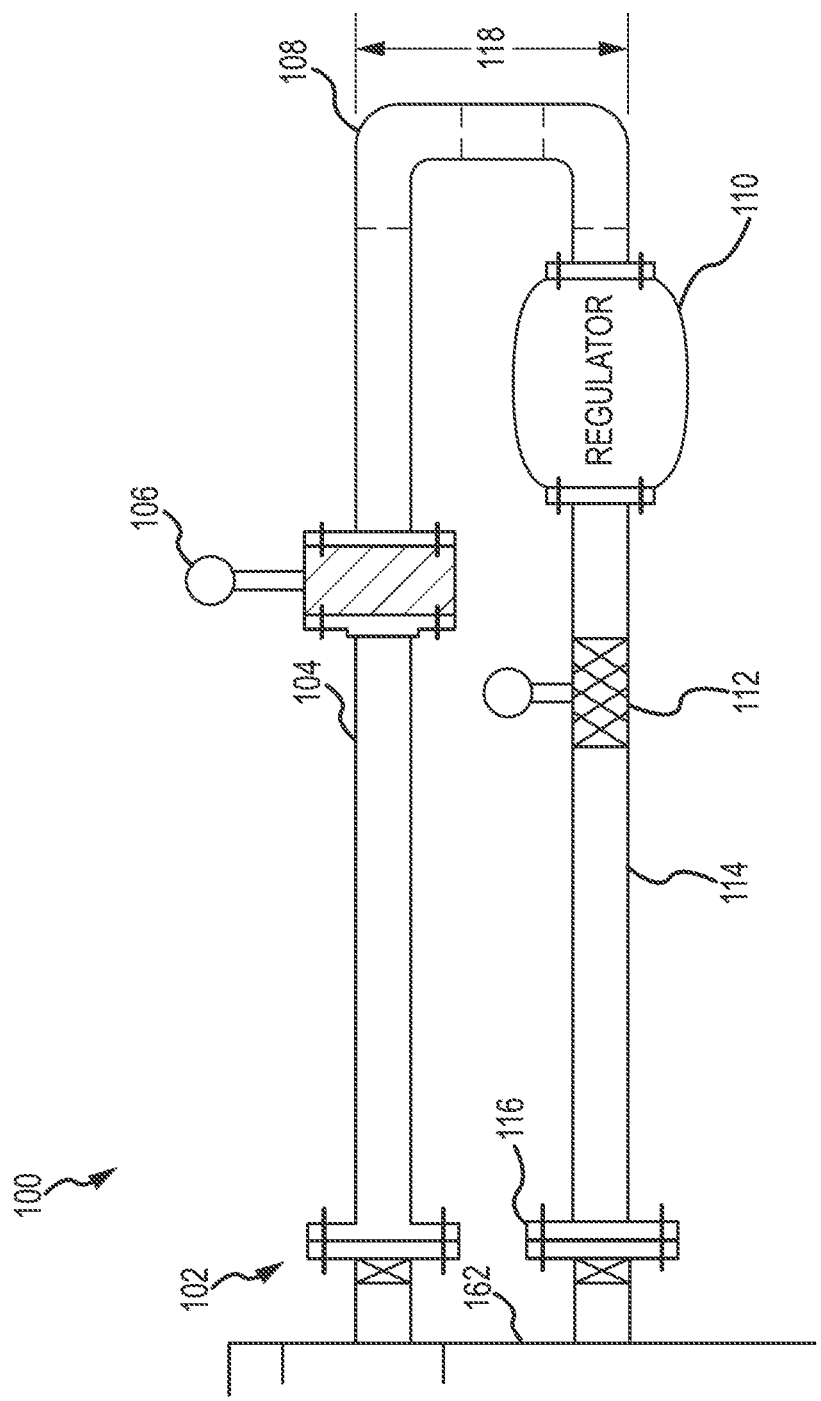
FIG. 1 is a diagram illustrating a leaching solution regulating system in accordance with various embodiments of the present disclosure.

The following description is merely exemplary in nature and is not intended to limit the present invention, its applications, or its uses. It should be understood that throughout the drawings, corresponding reference numerals indicate like or corresponding parts and features. The description of specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Furthermore, the detailed description of various embodiments herein makes reference to the accompanying drawing figures, which show various embodiments by way of illustration. While the embodiments are described in sufficient detail to enable those skilled in the art to practice the invention, it should be understood that other embodiments may be realized, and that logical and mechanical changes may be made without departing from the spirit and scope of the present invention. Thus, the detailed description herein is presented for purposes of illustration only and not of limitation. For example, steps or functions recited in descriptions any method, system, or process, may be executed in any order and are not limited to the order presented. Moreover, any of the step or functions thereof may be outsourced to or performed by one or more third parties. Furthermore, any reference to singular includes plural embodiments, and any reference to more than one component may include a singular embodiment.

The present disclosure relates, generally, to systems and methods for metal recovery and, more specifically, to systems and methods for subsurface metal recovery and systems for regulating leaching solution flow to subsurface metal recovery systems.

Conventional heap leaching processes may comprise forming a mass of ore, known as a heap, over a base or pad. Ore, for example, crushed ore, is typically processed to a desired particle size and uniformity. However, ore, referred to as run-of-mine ore, may be placed on the heap without any post-fragmentation processing. Ore may comprise any metal bearing material, such as an ore, a combination of ores, a concentrate, a process residue, a flotation tailings product, an impure metal salt, combinations thereof, or any other material from which metal values may be recovered. Metal values such as, for example, copper, gold, silver, zinc, platinum group metals, nickel, cobalt, molybdenum, rhenium, uranium, rare earth metals, and the like may be recovered from ore in accordance with various embodiments. In various embodiments, ore comprises copper and copper containing minerals and may comprise chalcopyrite, chalcocite, covellite, bornite, tetrahedrite, digenite, malachite, azurite, cuprite, chrysocolla, tennantite, and/or dioptase, for example. In various embodiments, most preferably, ore comprises chalcopyrite Conventional heap leaching may comprise distributing a leaching solution over the surface of a heap of ore via a leaching solution distribution system. A leaching solution distribution system may generally comprise one or more pipes arranged to deposit leaching solution to the heap. The leaching solution distribution system may be configured in a network arrangement to receive leaching solution from one or more sources and conduct the leaching solution to the heap. The leaching solution may be sourced from a variety of locations. Fresh acid and/or water may be used as well as acid and/or water that is recycled or reclaimed from other metal value recovery processes, such as raffinate from a solvent extraction/electrowinning ("SXEW") process. In various embodiments, fresh basic medium and/or water may be used as well as basic medium and/or water that is recycled or reclaimed from other metal value recovery processes. In various embodiments the leach solution may be enhanced with specific strains of bacteria, air, enriched air, oxygen, chemical oxidants, and/or leach enhancing chemicals. In various embodiments, the leach solution may be heated. Accordingly, the leaching solution distribution system may be provided these sources of leaching solution and distribute them to the heap.

The leaching solution distribution system may comprise one or more primary pipes that are fluidly coupled to smaller pipes or branches. The smaller pipes may comprise one or more orifices at predetermined distances. In that regard, the orifices are configured to allow leaching solution to drip or otherwise flow from the smaller pipes and onto the heap. The leaching solution distribution system may be configured to distribute leaching solution at predetermined flow conditions, for example, within a predetermined range of pressures and/or flow rates. For example, a flow rate that is above a predetermined flow rate range may have a cooling effect on the leach pad and negate the effect of any exothermic reactions or heating efforts. Additionally, a high flowrate may exacerbate pad permeability issues by flooding flow channels within the heap beyond their capacity to carry solution. This may result in structural problems with the earthen heap. A flow rate that is below a predetermined flow rate range may not deliver enough of the reagents that drive the leach reaction, so that the reaction either does not result in an optimum economic metal recovery or takes much longer to do so. In that regard, maintaining leaching solution flow conditions within a predetermined range is beneficial.

Such conventional surface heap leaching operations may be suitable for some portions of the heap, however, may be ineffective for other portions of the heap depending on the properties of the heap and materials present in the heap. For example, some materials, such as high clay content materials, or other dense or high content materials, may prevent effective leaching of the target ore material by preventing leaching solution from percolating through these impenetrable areas. Other known problems, such as large amounts of scaling and a high degree of saturation, may present further problems for conventional surface heap leaching operations.

Additionally non-uniform percolation of solution throughout the heap may be caused by the presence of fines, elevated bulk densities and zones of secondary precipitation and mineralization. These less-than-optimal conditions resulting in non-uniform percolation occur to some extent with all heap-leachable ores. Non-uniform percolation may also result from elevated heap bulk densities that, due to elevated density, result in reduced porosity negatively impacting fluid communication pathways within the heap matrix and thereby inhibiting optimum percolation rates and metal recovery. Elevated heap bulk densities and reduced porosity within the heap can be attributable to material compaction that occurs during heap construction or operation, insular laminated zones can exhibit elevated bulk density and lower porosity and fluid communication pathways and thereby reduce percolation rates, whether such conditions are attributable to secondary mineralization or precipitation reactions associated with the percolated lixiviant and contact with gangue and mineralized heap constituents, percolation reduction attributable to sorting of lenticular clays and fines stratified within the heaped material or percolation reduction due to elevated bulk density within the heap resulting from triaxial pressures and structural loading conditions of the heap pad as constructed, operated and maintained, including instances where the heap exhibits elevated triaxial pressures and geotechnical loading upon the heap matrix derivative from heap depth, such heap conditions impacting and reducing percolation flow rates and corresponding physical and chemical transport of metals within the heap.

It is well understood that the leaching reagents must percolate throughout the heap matrix so as to diffuse into the ore particles and react with the metal bearing minerals in the ore, and then the resultant metallic complexes have to diffuse back into the solution. The transport of the solute is influenced by the way the solute interacts with the solid-liquid matrices in the porous medium. The rate-limiting mass transfer between stagnant and mobile liquids leads to the physical non-equilibrium of solute. The leaching solution will choose the path of least resistance, commonly called channeling. If enough fine material has built up within the heap materials, there is a chance the solution may not be able to flow at all; this is referred to as blinding. These particles clog the spaces between the larger ore particles and result in an uneven distribution of the leaching solution. This leads to poor interaction between the ore and leach solution, producing inadequate metal recoveries, or the need to extend the leach time. Accordingly, a subsurface metal recovery system may attempt to increase metal recovery by targeting areas of low permeability or areas comprising certain identified chemical properties and injecting leach solution directly adjacent to or within these areas. Such an application may be more effective at recovering metal values than conventional surface heap leaching operations. Further, some surface heap leaching operations may be effective at leaching metal values, but ineffective at recovering the metal values from the heap, as the metal-rich solution may get locked up in the heap due to permeability issues. Accordingly, a subsurface metal recovery system may seek to increase recovery of metal values from the heap in addition to more effective leaching.

A further complication in traditional heap leaching systems is the precipitation of compounds from the applied leach solution. For example, in copper leaching, and in particular chalcopyrite leaching, iron-containing minerals are intentionally dissolved as they often contain copper and/or assist in the production of heat through exothermic reactions. However, oxygen is also commonly added in heap leaching, which causes the dissolved iron now in solution to oxidize to ferric iron, a compound that is prone to precipitating out of solution as jarosite. This precipitation, similar to the fines discussed above, then builds up within the heap materials, clogging solution pathways and decreasing permeability. Additionally, jarosite is characteristically sticky and tends to coat nearby mineral surfaces in a process called passivation, impeding the leaching solution from reacting with the minerals. This impact is compounded when costly additives in the leaching solution are prevented from reacting with the ore as intended and are thus wasted. Accordingly, the addition of a jarosite-controlling substance to the leach solution would be beneficial to address such issues.

In various aspects of the instant invention, it has been found that citric acid is effective at controlling and mitigating jarosite precipitation in several ways. Citric acid acts as a chelating agent for iron and as such, helps keep iron in solution, preventing it from precipitating out into jarosite. Further, citric acid can dissolve jarosite back into solution, opening up solution flow channels in the heap and exposing mineral surfaces previously plugged and covered with precipitates respectively. Ferric iron in solution also acts as an oxidant in secondary sulfide leaching, so keeping it in and/or dissolving it back into solution has an added benefit of improving secondary sulfide recovery. However, citric acid alone, as seen in Table 1, has negligible impact on chalcopyrite recovery and would not be useful to maximize recovery. As such, it is necessary to use other additives in combination with citric acid to maximize recovery.

Previous experiments show that using hydrogen peroxide as an oxidant in chalcopyrite leaching generated significant amounts of iron in solution, swiftly resulting in jarosite precipitation and rendering the ore relatively impermeable and unable to be further leached. As seen in Table 1, while the hydrogen peroxide initially leached the ore and recovered some copper, the vast amounts of jarosite produced quickly prevented further leaching from occurring. Thus, hydrogen peroxide is infeasible to use alone as an oxidant as its passivation rate nullifies any leaching benefit it may initially confer. However, as seen in Table 1, when used in addition with citric acid, its full leaching impact can be felt as the citric acid keeps the iron in solution and allows the hydrogen peroxide to interact with the chalcopyrite.

TABLE 1

Conditions and Copper (Cu) Recovery for Various Leaching Methods

| GROUP NO. | $H_2O_2$ (%) | CITRIC ACID (G/L) | CU RECOVERY (%) |
|---|---|---|---|
| 1 | 0 | 0 | 6.4 |
| 2 | 1 | 0 | 38.3 |
| 3 | 0 | 10 | 5.9 |
| 4 | 1 | 10 | 49.3 |

The experiment in Table 1 used an ore sample containing, in weight percent based on the total weight of the ore, 0.01% chalcocite, 0.12% chalcopyrite, 0.01% copper-bearing clays, 0.01% copper-bearing biotite, and 0.01% of other types of copper-bearing materials and recovery of the sample was taken after being leached for 24 hours. Table 1 illustrates that neither citric acid nor hydrogen peroxide would help maximize recovery if used alone. As discussed above, while there was some recovery shown in Group 2, which used hydrogen peroxide only, this sample was quickly rendered impermeable from precipitated jarosite and was unlikely to be further leached. However, Group 4, which comprised both hydrogen peroxide and citric acid, resulted in significant recovery within the 24-hour leaching timeframe, showing an 11% greater recovery than the second highest recovery. Had this experiment had a longer leaching cycle, it is more than likely that recovery would have improved further as no jarosite was seen and the ore remained permeable. As demonstrated in Table 1, the synergistic combination of hydrogen peroxide and citric acid helps maximize recovery in copper leaching, an unexpected outcome from two additives that have been shown to be ineffective individually.

When designing a subsurface metal recovery system, the mineral forms and quantities of the remaining metal values in the heap are factors to take into account so raffinate can be injected only at targeted locations and depths within the heap in order to minimize application costs and achieve the most effective recovery. It would thus be beneficial to determine an ore map of the heap, wherein areas of recoverable metal-bearing material in the heap are identified, before implementing a subsurface application system to target locations that would provide optimum economic return. Determining such an ore map may be accomplished in accordance with various embodiments, such as, for example, analysis of data from geographic information system ("GIS") programs combined with historical leach recovery data. In accordance with various embodiments, determining an ore map before implementing a subsurface application system may help maximize recovery.

Particulates or other solid phase impurities and/or organic phase contaminants (together, referred to as "crud" as mentioned above) may be contained within the leaching solution. Over time, crud may occlude or otherwise obstruct the orifices of the leaching solution distribution system. Such obstruction restricts leaching solution flow. As discussed above, improper leaching solution flow is detrimental to leaching and/or recovery processes. The pressure and/or flow rate of leaching solution in a leaching solution distribution system may change in response to one or more orifices becoming plugged. Identifying these changes in pressure and/or flow rate may be accomplished in accordance with various embodiments.

In accordance with various embodiments, a subsurface leaching system and solution regulating system is disclosed that may comprise one or more leaching solution regulating modules. The leaching solution regulating module may comprise a system configured to monitor pressure and/or flow rate across a portion of a subsurface leaching solution distribution system and/or regulate the pressure and/or flow rate to a target operational condition. A change in pressure and/or flow rate may allow for identification and amelioration of one or more plugged orifices and allow a target operational condition to be more readily achieved.

A target operational condition is an operational control that is selected by leaching operators to allow the leach heap to run most efficiently and ultimately maximize recovery. In various embodiments, a target operational condition is controlled by multiple factors, such as pressure, mass flow rate, or volumetric flow rate. To determine a target operational condition, operators must make an assessment of the various operational parameters of the specific heap, such as, for example, mineralogy, chemistry, permeability, and remaining recoverable metal values, any of which may be more important than another based on the unique properties of the assessed heap. In various embodiments, a target operational condition may be selected to achieve a desired outcome, such as maximizing recovery, preventing plugging of a leaching solution distribution system, and/or minimizing the "locking up" of solution in the heap. In various embodiments, a target operational condition is variable and may be adjusted throughout the leach cycle to shift from one desired outcome to another in response to evaluating the data of a leach cycle and determining changes in the heap.

For example, the target operational condition may have originally been selected to reduce zones of impermeability in the heap but, after leaching commenced, the impacted zones' permeability improved. In such a scenario, an operator may choose to adjust the target operational condition to achieve a second, different, outcome, such as maximizing recovery. In accordance with various embodiments, when the desired outcome is to maximize recovery, preferably, all, or most of the physical and chemical factors of the heap will be taken into account for determining target operational condition. Each of these factors, such as, for example, mineralogy, chemistry of the heap and/or lixiviant, permeability, and areas of under-leached material contribute to the overall recovery of a metal value. To consider only a single factor when selecting a target operational condition will not maximize recovery, as the unconsidered factors may react in such a way that leaching efficiency decreases. For example, if only permeability is considered to maximize recovery, under-leached areas of the heap that have poor permeability due to blinding or channeling will be neglected in favor of areas with better permeability, even if those areas have been more effectively leached than others. As such, preferably a considerable number of factors should be taken into consideration when determining a target operational condition to maximize recovery. In accordance with various embodiments, the operational flexibility of the subsurface leaching system and solution regulating system maximizes leaching efficiency. In accordance with various embodiments, a implementing a leaching solution regulating module with a subsurface delivery system may help maximize recovery.

In accordance with various embodiments, a leaching solution regulating module may comprise one or more pipes or conduits configured to fluidly couple to a portion of a subsurface leaching solution distribution system, receive leaching solution from the subsurface leaching solution distribution system, wherein the leaching solution comprises citric acid and hydrogen peroxide, detect at least one of a pressure and/or flow rate, and allow the leaching solution to be distributed back to the subsurface leaching solution distribution system at a target operational condition. In various embodiments, a leaching solution regulating module may comprise a U-shaped geometry or other similar shape to allow for a compact design. A compact design may allow for easy installation into existing leaching solution distribution systems.

In accordance with various embodiments, a leaching solution regulating module may comprise an electronic regulating module that may receive data regarding at least one of a pressure or flow rate. Data may then be sent, in real time and/or a batch process, through a data network to a monitoring module. The monitoring module may communicate via a data network, for example, a wireless data network, to one or more leaching solution regulating modules. In that regard, status of the leaching solution regulating modules may be centralized. Alerts regarding detected issues to be addressed may then be distributed to the appropriate resource for further investigation and/or amelioration. Centralized monitoring may provide enhanced logistics, especially when used in connection with large area heap leaching operations.

In accordance with various embodiments, across a leaching solution distribution system, which may comprise a subsurface leaching solution distribution system, multiple leaching solution regulating modules may be installed to monitor and/or regulate various local areas of the leaching solution distribution system. For example, a centralized monitoring system may comprise a plurality of measurement transmitters in a measurement network. A meter and/or transmitter as described herein may comprise an electronic module that implements a data transmission protocol such as the HART network. In that regard, the plurality of measurement transmitters may transmit data to a gateway. In various embodiments, a leaching solution distribution system may cover large areas, such as many acres or square miles. In that regard, the plurality of measurement transmitters may function as repeaters. The measurement transmitters may transmit their own data to the gateway. However, in various embodiments, a remote measurement transmitter (i.e., a measurement transmitter far from the gateway) may transmit data to a measurement transmitter that is closer to the gateway. The measurement transmitter may then relay or repeat the data transmission to the gateway.

In various embodiments, the gateway may be configured to receive data from the plurality of measurement transmitters. The gateway may implement one or more communications interfaces such as a data transmission protocol (e.g., a HART protocol or a Delta V interface). The gateway may perform preprocessing functions, for example, by aggregating data by measurement transmitter. The gateway may aggregate these data and transmit them via a network to a processor. The network may comprise a wired and/or wireless Ethernet network, as referenced above. The processor may process data from a gateway and perform various analytical routines. The processor may implement a Delta V interface to process data to and from the gateway. The Delta V interface may exist on a Delta V area control network that is able to interface with an Ethernet data network. The processor may process data from the gateway using a variety of suitable methods. For example, the processor may perform graphical analysis and/or may implement a Human Machine Interface (HMI), which may allow a human user to analyze data provided by the processor and make decisions with regards to a status of leaching solution distribution system.

With reference to FIG. 1, in accordance with various embodiments, an exemplary leaching solution regulating module 100 is shown. In various embodiments, leaching solution regulating module 100 may be configured to monitor flow conditions of leaching solution, regulate the flow of leaching solution to achieve a target operational condition, and deliver the leaching solution at the target operational condition to a subsurface leaching distribution system. An interface 102 may comprise a joint that fluidly couples a pipe 104 to leaching solution distribution system 162, which in various embodiment may comprise a subsurface leaching solution distribution system. The term "fluidly couples" or "fluidly coupled" may refer to a configuration allowing a fluid to be communicated from one component to another, for example, from a pipe of leaching solution distribution system 162 to pipe 104. Stated another way, by way of example, a pipe of leaching solution distribution system 162 may be in fluid communication with pipe 104 such that fluid may pass between them. Interface 102 may comprise a pair of mating flanges secured by one or more fasteners. In this manner, leaching solution may be conducted through interface 102 without material loss, if any, of leaching solution across interface 102.

In various embodiments, pipe 104 and pipe 114 may comprise any suitable pipe. For example, pipe 104 may comprise any material suited to conduct leaching solution, for example, any metal such as steel and/or any suitable thermoplastic material, provided the thermoplastic material is configured to resist corrosion due to exposure to leaching solution. In various embodiments, pipe 104 and pipe 114 comprise approximately 3" and/or 4" schedule 80 CPVC piping. Further, while described herein as a "pipe," pipe 104 and pipe 114 are not limited in this regard and may comprise any suitable structure for delivery of leaching solution to and/or beneath a surface of a heap, for example, a hose, conduit, or other suitable structure.

In accordance with various embodiments, pipe 104 may comprise a length that is at least twice its diameter. Such sizing improves the accuracy of leaching solution regulating module 100. In various embodiments, as described herein, meter 106 may benefit from having a length of at least two pipe diameters or more both upstream and downstream of meter 106.

In accordance with various embodiments, pipe 104 may fluidly couple to meter 106. Meter 106 may be any device capable of measuring a fluid pressure and/or flow rate. "Flow rate" may refer to volume of fluid per unit time or mass of fluid per unit time within a pipe, while "mass flow rate" may refer to mass of fluid per unit time within a pipe and "volumetric flow rate" may refer to volume of fluid per unit time within a pipe. Meter 106 may comprise any suitable technology for detecting a pressure and/or flow rate. In accordance with various embodiments, meter 106 may comprise a differential pressure flow meter, for example, one having an orifice plate with one or more apertures. An orifice plate with two or more apertures has particular advantages as it is associated with a shorter length of pipe both downstream and upstream from the orifice plate. Stated another way, a more compact leaching solution regulating module 100 may be achieved using a differential pressure flow meter having an orifice plate with two or more apertures. By introducing an orifice plate into the flow and assessing differential pressure, flow rate after may be determined. For example, meter 106 may comprise a compact orifice meter such as a compact orifice meter manufactured by Emerson Electric Company, 8000 West Florissant Avenue, P.O. Box 4100, St. Louis, MO, USA 63136. More specifically, meter 106 may comprise a compact orifice meter sold by Emerson Electric Company under the model number 30515 or other functionally equivalent meters. In accordance with various embodiments, meter 106 may comprise an apparatus configured to measure a pressure and/or flow rate that is in electrical communication with an electronic module to store, process, and/or report the detected pressure and/or flow rate. An electronic module of meter 106 may include a communications interface. Communications interfaces allow data to be transferred between an electronic module and external devices. Examples of communications interface may include a wired Ethernet network, a wireless Ethernet network (e.g., an ad hoc network utilizing IEEE 802.11a/b/g/n/ac), a wireless communications protocol using short wavelength UHF radio waves and defined at least in part by IEEE 802.15.1 (e.g., the BLUETOOTH protocol maintained by Bluetooth Special Interest Group), a low power wireless protocol such as Bluetooth Smart, inductive coupling, near field communication (NFC), or other protocol having a physical link comprising radio frequency (RF) signals. Communications interfaces may also include data transmission protocols such as Highway Addressable Remote Transducer ("HART") protocol, transmission control protocol ("TCP") and Internet Protocol ("IP").

For example, in accordance with various embodiments, meter 106 may comprise a HART protocol interface. The HART protocol is a digital automation protocol that may convey data over a wired or wireless data network. The HART protocol defines a HART packet data structure wherein data may be encapsulated and transmitted. In that regard, the electronic module of the meter 106 may be configured to periodically determine the pressure and/or flow rate of the leaching solution passing through the meter 106, encode the pressure and/or flow rate into a HART packet data structure and transmit the HART packet data structure to another HART-compliant module, as discussed herein. Meter 106 may record pressure and/or flow rate at any suitable period, from about 120 Hz to 1 Hz, and, in various embodiments, once a minute, once every ten minutes, and once every hour or over potentially longer intervals.

In accordance with various embodiments, leaching solution may flow from meter 106 into U-shaped section 108. U-shaped section 108 may comprise one or more pipes configured in a U shape. U-shaped section 108 may be configured to turn the flow of leaching solution on the order of one hundred eighty (180) degrees. Distance 118 is the distance within which the flow of leaching solution is turned. U-shaped section 108 is configured to mate with regulator 110 to conduct leaching solution into regulator 110. While described with reference to a U-shape, U-shaped section 108 is not limited in this regard and may comprise any suitable shape, for example, a "C" or "V" shape, such that leaching solution may flow through leaching solution regulating module 100 in a compact and efficient manner and be returned to a leaching solution distribution system.

In accordance with various embodiments, regulator 110 may comprise any suitable pressure regulator or flow rate regulator, such as a control valve. For example, regulator 110 may be any device suitable for regulating pressure and/or flow rate of fluid within a pipe or other suitable structure. Regulator 110 may comprise any device capable of altering the pressure and/or flow rate of a fluid in a pipe. For example, regulator 110 may be a pressure and/or flow rate sustaining valve and/or a pressure and/or flow rate reducing valve and/or a pressure and/or flow rate increasing valve. In various embodiments, regulator 110 may further comprise a pressure and/or flow rate reducing valve that reduces higher upstream pressure and/or flow rate to a lower, constant downstream pressure and/or flow rate, regardless of fluctuating demand or varying upstream pressure and/or flow rate. In various embodiments, regulator 110 may comprise a pressure and/or flow rate sustaining valve configured to sustain (i.e., maintain constant) pressure and/or flow rate in response to a pressure and/or flow rate drop to a pressure and/or flow rate below a target value. The regulator 110 may comprise a 3-way valve configured with a vent to prevent a pressure and/or flow rate drop (referred to as a "3-way regulator"). In that regard, regulator 110 prevents a pressure and/or flow rate drop across leaching solution regulating module 100. Regulator 110 may comprise a pressure and/or flow rate adjustment control feature that is configured to adjust the target pressure and/or flow rate. In that regard, the target pressure and/or flow rate is the pressure and/or flow rate below which regulator 110 will act on the leaching solution to increase pressure and/or flow rate in order sustain the target pressure and/or flow rate. The pressure and/or flow rate adjustment control feature may be adjusted manually or via an electronic interface. Regulator 110 may further comprise a filter to capture and remove crud from the leaching solution.

In accordance with various embodiments, transmitter 112 may be configured to periodically report the pressure and/or flow rate of leaching solution across leaching solution regulating module 100 and/or a binary status of whether the pressure and/or flow rate of the leaching solution across leaching solution regulating module 100 is below and/or above the target pressure and/or flow rate of regulator 110. Transmitter 112 may comprise an electronic module configured to implement the HART protocol, as described above with reference to meter 106. Transmitter 112 may measure pressure data from leaching solution regulating module 100, for example, by measuring the pressure and/or flow rate at a point within or across leaching solution regulating module 100. In various embodiments, transmitter 112 may package pressure and/or flow rate data and transmit the data using the HART protocol. Transmitter 112 may record pressure and/or flow rate at any suitable period, from about 120 Hz to 1 Hz, and, in various embodiments, once a minute, once every ten minutes, and once every hour or over potentially longer intervals. In various embodiments, transmitter 112 may be configured to provide status regarding the pressure and/or flow rate of leaching solution to the electronic module associated with meter 106. In various embodiments, transmitter 112 is housed separately from regulator 110 and meter 106 and collects data for broadcast using the HART protocol.

Regulator 110 may be configured to interface with pipe 114 and conduct leaching solution to pipe 114. Pipe 114 returns leaching solution to leaching solution distribution system 162, such as a subsurface leaching solution distribution system, through interface 116. In that regard, interfaces 116 and 102 may be referred to as leaching solution distribution system interfaces. While discussed in relation to FIG. 1 as comprising a meter 106, a regulator 110, and a transmitter 112, leaching solution regulating module 100 is not limited in this regard and may comprise any combination of components capable of monitoring flow conditions associated with leaching solution and setting such flow conditions to a target operational condition.

Figure 2:
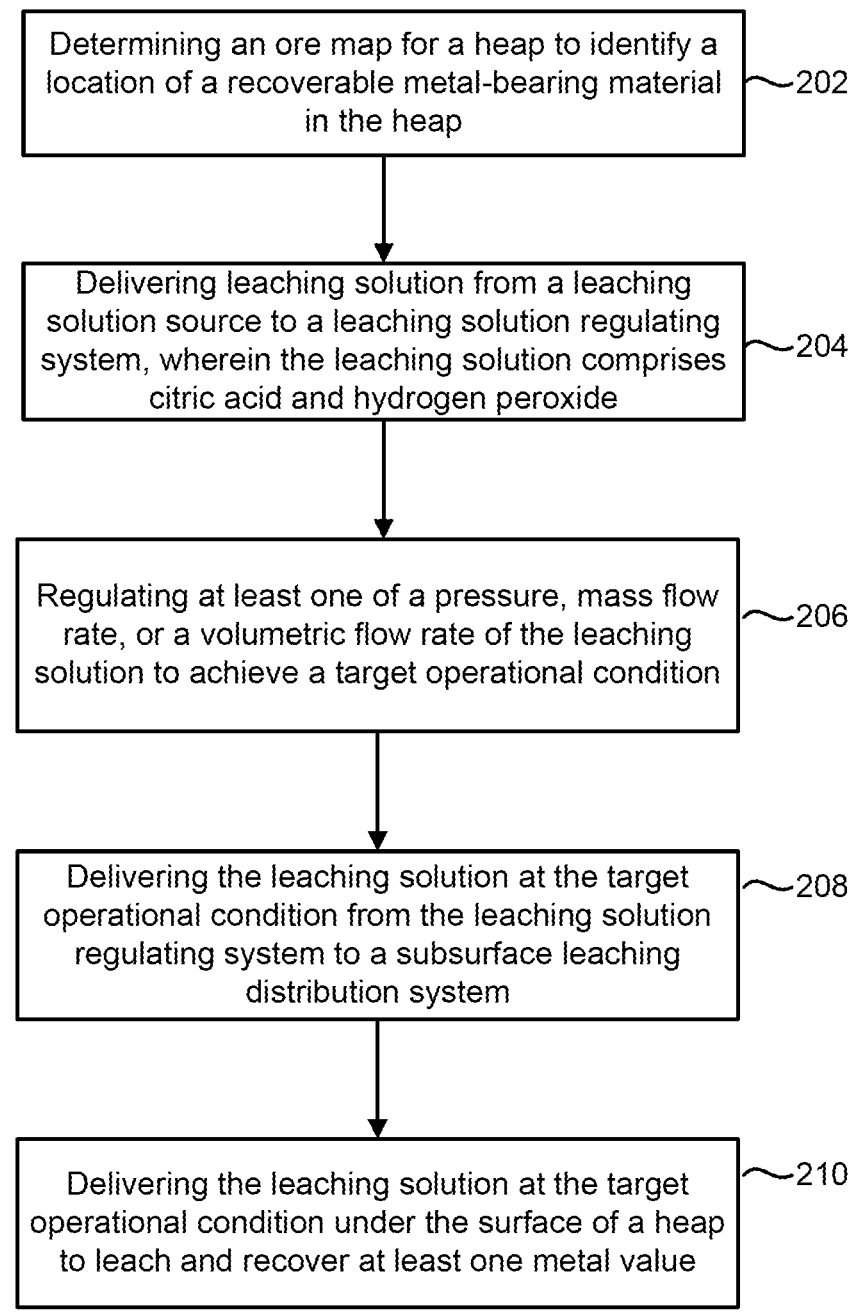
FIG. 2 is a diagram illustrating a method for identifying areas of recoverable ore, regulating leaching solution flow, and delivering leaching solution beneath the surface of a heap in accordance with various embodiments of the present disclosure.

With reference to FIG. 2, in accordance with various embodiments, a method 200 of regulating and delivering leaching solution beneath the surface of a heap is shown. In various embodiments, method 200 may comprise determining a location of recoverable metal-bearing material in a heap based on determining an ore map for the heap (step 202). The ore map is used to determine areas suitable for further leaching and may help target remaining economic pockets of residual copper for recovery initiatives, such as targeting these areas with leaching solution under the surface of a heap. The ore map can also be used to determine areas for treatment of passivation and occlusion based on identifying locations with high concentration of iron-bearing materials.

In various embodiments, determining an ore map helps maximize recovery of a subsurface leaching system. In various embodiments, the ore map comprises a variety of data inputs from the mine and leaching process, such as, for example, ore placement targeting via dispatch data, truck sensor data, GIS polygon data and/or mineralogy data (e.g., from a block model).

The ore map may also be configured to communicate with Mine Material Tracking ("MMT") systems and receive further data inputs from such systems. In various embodiments, the ore map may include a determination of the total mineralogy per heap through data obtained from MMT, section mapping, irrigation, and polygons. In various embodiments, the ore map may also include the addition of flow data, irrigation data and remaining copper prediction from a machine learning model (e.g., multi-layer perceptron ("MLP") to obtain information by section and by date for a heap. The ore map uses data about where the copper is from, where the copper is placed and where the copper is remaining. The ore map may merge on the date and heap at the date level and section level by combining the PLS grade and flow and/or chemistry (e.g., acid) concentration at the date level and heap level with the raffinate irrigation on a heap at the date level and section level. The ore map merges the date and heap, so the ore map can provide raffinate chemistry data and irrigation data at the date level and understand the impact on the section on that date.

In various embodiments, the ore map may also provide a visualization of where the heap includes recoverable amounts of copper remaining, based on historical leaching processes for the heap. The ore map may also include 4D visualization, including x,y,z and time information. The ore map may provide interactive visualization of all (or any subset) heap, section mineralogy populated on the map of each heap, filtering of sections by lift, heap or mineralogy composition and/or displaying aggregated values for selected sections. Ore Map 4D visualization (aka "ore finder") may include determining x, y, z locations of the remaining copper and time-series layering. The ore map may define heap and section boundaries based on polygons recorded in GIS. Dump locations of haul trucks may be mapped into these polygons based on combined signals from MMT location information (which obtains information from a beaconing system), GPS coordinates pulled from sensors and other systems on haul trucks and mapping section identifiers and sub-piles to specific leach heaps. After the dump locations of trucks are known, the MMT data (associated with all trucks matched to a given section) are aggregated and averaged to estimate section-level characterizations of mineralogy and P80. Recovery from these sections may be estimated based on the column test model, and the remaining copper may be calculated at the section-level by deducting estimated recovered copper from initial placements. Finally, the ore map may determine which sections are economically viable for recovery via drip, wobbler or injection irrigation based on a number of contiguous high-remaining sections and the proximity of the high-remaining sections to a top lift.

With continued reference to FIG. 2, the method may further comprise delivering leaching solution from a leaching solution source to a leaching solution regulating system, which may comprise a leaching solution regulating module similar to leaching solution regulation module described with reference to FIG. 1 (step 204), and wherein the leaching solution may comprise citric acid and/or hydrogen peroxide in an amount effective to maximize recovery. In accordance with various embodiments, an effective amount of citric acid may comprise in the range about 0 g/L to about 20 g/L, more preferably in the range of about 5 g/L to about 15 g/L, and more preferably, about 10 g/L. In accordance with various embodiments, an effective amount of hydrogen peroxide may comprise in the range about 0% to about 10%, more preferably, in the range of about 0.5% to about 5%, and more preferably, about 2%.

The method may further comprise regulating at least one of a pressure, a mass flow rate, or a volumetric flow rate to achieve a target operational condition (step 206). In accordance with various embodiments, implementing a leaching solution regulating module helps maximize recovery through its ability to achieve the target operational condition and vary the target operational condition in response to changes in the operational characteristics of the heap, such as, for example, mineralogy, chemistry, and permeability. In accordance with various embodiments, the method may further comprise delivering the leaching solution at the target operational condition from the leaching solution regulating system to a subsurface leaching solution distribution system (step 208). The method may further comprise delivering the leaching solution at the target operational condition under the surface of a heap to leach and recover at least one metal value (step 210).

In various embodiments, the method may further comprise a treatment step (not shown) in which citrates, such as, for example, citric acid, are delivered to areas of the heap identified to be impacted by iron precipitation via the subsurface leaching solution distribution system. This treatment step would dissolve the iron back into solution, exposing mineral surfaces and opening new solution flow channels in the heap, allowing for the leaching solution to react with the mineral surfaces and flow more evenly through the heap. In various embodiments, the treatment step may precede step 210. In other embodiments, treatment step may occur concurrent with step 210.

The method as illustrated in FIG. 2 has improvements over historical subsurface leaching methods as it has the flexibility to set and adjust the target operational condition based on the optimization of one or more of a selection of different operational parameters in order to maximize recovery. Operational parameters that may be selected for optimization, as discussed above, can include a heap's unique mineralogy, chemistry, permeability, and remaining recoverable metal values. Unlike the prior art, wherein the operating pressure is selected in response to the hydraulic properties of the heap in order to maintain heap stability, the instant invention is primarily directed towards maximizing recovery through an assessment of a variety of operational controls, any of which may be more important based on the various specific characteristics of the heap. That significant difference notwithstanding, all operational controls are reviewed before implementation to ensure they will not compromise the integrity of the heap.

In various embodiments, maximizing recovery comprises an assessment of a variety of operational controls and setting the target operational condition to optimize one or more based on the various specific characteristics of the heap. In accordance with various embodiments, maximizing recovery comprises regulating pressure through a leaching solution regulating system to achieve a target operational condition. In accordance with various embodiments, maximizing recovery comprising regulating flow rate through a leaching solution regulating system to achieve a target operational condition. In accordance with various embodiments, maximizing recovery comprises determining an ore map of the heap to identify areas of recoverable metal value before deploying a subsurface leaching solution.

Figure 3:
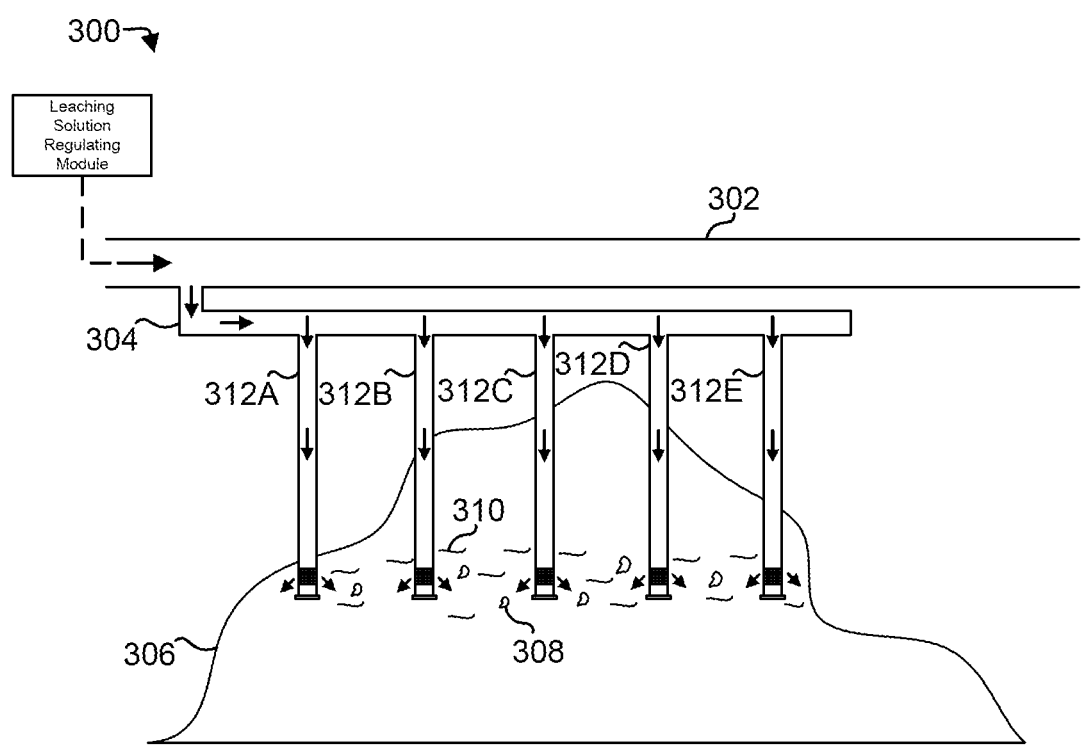
FIG. 3 is a diagram illustrating a subsurface leaching solution distribution system in accordance with various embodiments of the present disclosure.

With reference to FIG. 3, in accordance with various embodiments, an exemplary subsurface leaching solution distribution system 300 is shown fluidly coupled to a leaching solution regulating module, which may be similar to that discussed with reference to FIG. 1 and may be configured to regulate flow of leaching solution to a target operational condition. Subsurface leaching solution distribution system 300 may comprise a primary pipe 302 which may fluidly communicate leaching solution to secondary pipe 304, for distribution of leaching solution within heap 306. Heap 306 may comprise one or more metal deposits 308 and one or more low permeable materials 310. One or more metal deposits 308 may be enclosed within one or more low permeable materials 310 such that traditional surface leaching techniques may be ineffective in leaching and/or recovering the one or more metal deposits 308.

In accordance with various embodiments, subsurface leaching solution distribution system 300 may comprise one or more subsurface injectors 312. Subsurface injectors 312 may comprise any suitable structure configured to deliver leaching solution at a target operational condition beneath the surface of a heap. In various embodiments, subsurface leaching solution distribution system 300 may comprise a first subsurface injector 312A, a second subsurface injector 312B, a third subsurface injector 312C, a fourth subsurface injector 312D, and a fifth subsurface injector 312E. Subsurface leaching solution distribution system 300 may also suitably comprise more or less than five subsurface injectors 312, in various embodiments. Subsurface injectors 312 may be fluidly coupled to primary pipe 302 and/or secondary pipe 304 to receive leaching solution and distribute the leaching solution to desired locations within heap 306.

The leaching solution regulating module, which may, in various embodiments, be a leaching solution regulating module similar to leaching solution regulating module 100 described with reference to FIG. 1, may be configured to condition the flow of leaching solution to a target operational condition and deliver the leaching solution to subsurface leaching solution distribution system 300. Specifically, a leaching solution regulating module, e.g. regulating module 100, which may be coupled to primary pipe 302 and/or secondary pipe 304 may be configured to set one of a pressure, a mass flow rate, or a volumetric flow rate and/or other parameter associated leaching solution within subsurface leaching solution distribution system 300. Such a parameter may be preselected, and leaching solution may be introduced in areas of low permeability within heap 306. The leaching solution regulating module may ensure that the target operational condition associated with the leaching solution is maintained throughout the subsurface heap leaching operation.

In accordance with various embodiments, the leaching solution may comprise a raffinate solution salvaged from a previous leaching operation. For example, the leaching solution may comprise raffinate, acidified water, fresh acid and/or water or acid and/or water that is recycled or reclaimed from other metal value recovery processes. The leaching solution may include an oxidant, such as, for example, ferric iron, hydrogen peroxide, other peroxides, chlorate, perchlorates, nitrates, and permanganates. Leaching solutions may also be oxidized by contact with air, enriched air, oxygen, or a stoichiometric air/SO2 mixture. In various embodiments, the leaching solution may contain one or more leaching aids targeted toward the minerology of the material to be leached, such as, for example, citric acid and/or hydrogen peroxide. As these leaching aids can be costly, they lend themselves particularly well to use in a subsurface leaching system where targeted application of solution at specific locations results in a more economical process than standard surface leaching. In various embodiments, the leaching solution may be heated prior to subsurface application. In various embodiments, the leaching solution may be sourced from a different location than leaching solution utilized in above surface leaching application systems.

In various embodiments, one or more flow conditions associated with the leaching solution may be selected and/or varied. For example, a flow rate associated with the leaching solution may be "pulsed" between a relatively low flow rate and a relatively high flow rate. Further, the composition of the leaching solution may be selected based on the chemical properties of the areas of the heap to be leached. Accordingly, the content and/or flow conditions of the leaching solution may be selected in order to increase the quantity of metal values leached and/or recovered from the heap.

With reference to FIG. 4A, an exemplary embodiment of a single injection well design 400 of a subsurface heap leaching operation is shown, in accordance with various embodiments. Single injection well design 400 may comprise a subsurface injector 402 inserted into a bore 404 formed into a heap and protruding at least partially from a surface 406 of the heap. In various embodiments, bore 404 may be formed through the surface 406 of the heap utilizing various techniques, including, for example, sonic drilling, rotary drilling, auger drilling, or direct push. Bore 404 may extend a predetermined depth into the heap such that subsurface injector 402 may deliver subsurface leaching solution adjacent to targeted areas to be leached. Bore 404 may extend any suitable depth into the heap and may comprise any suitable diameter. In various embodiments, bore 504 may extend between approximately 0 and 250 feet or more into the heap and comprise a diameter between about 0 and 12 inches, preferably approximately 8 inches.

In accordance with various embodiments, subsurface injector 402 may comprise any material suited to conduct leaching solution, for example, any metal such as steel or other alloys and/or any suitable thermoplastic material, provided the thermoplastic material is configured to resist corrosion due to exposure to leaching solution. In various embodiments, subsurface injector 402 may comprise 4-inch schedule 40 PVC piping. Subsurface injector 402 may further comprise a slotted portion 408 positioned near a distal end of subsurface injector 402. For example, slotted portion 408 of subsurface injector 402 may comprise a 4-inch schedule 40 PCV screen comprising any suitable slot size and shape, for example, approximately 0.04 to 0.08-inch slots, e.g., 0.06-inch slots, comprising a circular-like or square-like geometry. Leaching solution may be configured to flow through subsurface injector 402 and out of slotted portion 408 into the heap. In various embodiments, slotted portion 408 may extend any length of subsurface injector 402, for example, between approximately 0 and 40 feet, such as approximately 20 feet. An end cap 410 may prevent leaching solution from flowing out of a distal end of subsurface injector 402.

In various accordance with various embodiments, bore 404 may be filled with one or more layers of material configured to provide stability and sealing for subsurface injector 402. Bore 404 may be filled with a first layer of material 412 around a distal end of subsurface injector 402, a second layer of material 414 around a middle portion of subsurface injector 402, and a third layer of material 416 around subsurface injector 402 near surface 406 of the heap. First layer of material 412 may comprise gravel such as pea gravel or similar sized gravel, second layer of material 414 may comprise a cushion material such as a clay material (e.g. bentonite), and third layer of material 416 may comprise a grout-based material such as a mixture of water, cement, and sand. However, first layer of material 412, second layer of material 414, and third layer of material 416 are not limited in this regard and may comprise any combination of materials capable of providing stability and sealing for subsurface injector 402.

In accordance with various embodiments and with reference to FIG. 4B, a nested well design 430 of a subsurface heap leaching operation is shown. Nested well design 430 may comprise a first subsurface injector 432 and a second subsurface injector 434 adjacent to first subsurface injector 432. First subsurface injector 432 and second subsurface injector 434 may be inserted into a bore 436 formed into a heap and protrude at least partially from a surface 438 of the heap. First subsurface injector 432 may be inserted into the heap a first depth, while second subsurface injector 434 may be inserted into the heap a second depth less than the first depth. In various embodiments, bore 436 may be formed through the surface 438 of the heap utilizing various techniques, including, for example, sonic drilling, rotary drilling, auger drilling, or direct push. Bore 436 may extend a predetermined depth into the heap such that first subsurface injector 432 and second subsurface injector 434 may deliver subsurface leaching solution adjacent to targeted areas to be leached. Bore 436 may extend any suitable depth into the heap and may comprise any suitable diameter. In various embodiments, bore 436 may extend between approximately 0 and 250 feet or more into the heap and comprise a diameter between about 0 and 12 inches, preferably approximately 9 inches.

In accordance with various embodiments, first subsurface injector 432 and second subsurface injector 434 may comprise any material suited to conduct leaching solution, for example, any metal such as steel or other alloy and/or any suitable thermoplastic material, provided the thermoplastic material is configured to resist corrosion due to exposure to leaching solution. In various embodiments, first subsurface injector 432 and second subsurface injector 434 may comprise about 3-inch schedule 40 PVC piping. First subsurface injector 432 and second subsurface injector 434 may further comprise one or more slotted portions 458 and 440 positioned near a distal end of first subsurface injector 432 and second subsurface injector 434, respectively. For example, slotted portion 458 of first subsurface injector 432 and slotted portion 440 of second subsurface injector 434 may each comprise a 3-inch schedule 40 PCV screen comprising any suitable slot size and shape, for example, about 0.04 to 0.08-inch slots, e.g., 0.06-inch slots, comprising a circular-like or square-like geometry. Leaching solution may be configured to flow through first subsurface injector 432 and second subsurface injector 434 and out of slotted portions 458, 440 into the heap. In various embodiments, slotted portions 458 and 440 may extend any length of first subsurface injector 432 and second subsurface injector 434, for example between approximately 0 and 20 feet or approximately 10 feet. First subsurface injector 432 and second subsurface injector 434 may each comprise an end cap 442, 444 which may prevent leaching solution from flowing out of a distal end of the first subsurface injector 432 and the second subsurface injector 434, respectively.

In accordance with various embodiments, bore 436 may be filled with one or more layers of material configured to provide stability and sealing for first subsurface injector 432 and second subsurface injector 434. Bore 436 may be filled with a first layer of material 446 around a distal end of first subsurface injector 432, a second layer of material 448 above (toward surface 438) first layer of material 446, a third layer of material 450 above second layer of material 448, a fourth layer of material 452 above third layer of material 450 and around a distal end of second subsurface injector 434, a fifth layer of material 454 above fourth layer of material 452, and a sixth layer of material 456 above fifth layer of material 454 and near surface 438 of the heap.

First layer of material 446 may comprise a gravel material such as pea gravel or other like gravel for filtering, second layer of material 448 may comprise a seal material such as a bentonite seal or clay material, third layer of material 450 may comprise a cushion material such as a clay material (e.g. bentonite), fourth layer of material 452 may comprise a gravel material such as pea gravel or other like gravel, fifth layer of material 454 may comprise a cushion material such as a clay material (e.g. bentonite), and fifth layer of material 456 may comprise a grout-based material such as a mixture of water, cement, and sand. However, first layer of material 446, second layer of material 450, third layer of material 452, fourth layer of material 454, and fifth layer of material 456 are not limited in this regard and may comprise any combination of materials capable of providing stability and sealing for first subsurface injector 432.

In accordance with various embodiments and with reference to FIG. 4C, a well monitoring design 460 of a subsurface heap leaching operation is shown. Well monitoring design 460 may comprise a subsurface injector 462 inserted into a bore 464 formed into a heap and protruding at least partially from a surface 466 of the heap. In various embodiments, bore 464 may be formed through the surface 466 of the heap utilizing various techniques, including sonic drilling, rotary drilling, auger drilling, or direct push. Bore 464 may extend a predetermined depth into the heap such that subsurface injector 462 may deliver subsurface leaching solution adjacent to targeted areas to be leached. Bore 464 may extend any suitable depth into the heap and may comprise any suitable diameter. In various embodiments, bore 404 may extend between about 0 and 250 or more feet into the heap and comprise a diameter between about 0 and 12 inches, preferably approximately 8 inches.

In accordance with various embodiments, subsurface injector 462 may comprise any material suited to conduct leaching solution, for example, any metal such as steel or other alloy and/or any suitable thermoplastic material, provided the thermoplastic material is configured to resist corrosion due to exposure to leaching solution. In various embodiments, subsurface injector 462 may comprise 4-inch schedule 40 PVC piping. Subsurface injector 462 may further comprise a slotted portion 468 positioned near a distal end of subsurface injector 462. For example, slotted portion 468 of subsurface injector 462 may comprise a 4-inch schedule 40 PCV screen comprising any suitable slot size and shape; in an exemplary embodiment, for example, 0.02-inch slots comprising a circular or square geometry may be utilized. Leaching solution may be configured to flow through subsurface injector 462 and out of slotted portion 468 into the heap. In various embodiments, slotted portion 468 may extend any length of subsurface injector 462, for example between approximately 0 and 150 feet or approximately 70 feet. An end cap 470 may prevent leaching solution from flowing out of a distal end of subsurface injector 462.

In accordance with various embodiments, bore 464 may be filled with one or more layers of material configured to provide stability and sealing for subsurface injector 462. Bore 464 may be filled with a first layer of material 472 around a distal end of subsurface injector 462 and a second layer of material 474 around a middle portion and extending to surface 466 of the heap. First layer of material 472 may comprise sand, while second layer of material 474 may comprise a cushion material such as a clay material (e.g. bentonite). However, first layer of material 472 and second layer of material 474 are not limited in this regard and may comprise any combination of materials capable of providing stability and sealing for subsurface injector 462.

Well monitoring design 460 may further comprise one or more sensors 476 distributed along a length of subsurface injector 462, in various embodiments. Sensors 476 may be any suitable device capable of measuring and communicating a pressure and/or flow rate of the leaching solution. Specifically, well monitoring design 460 may comprise one or more sensors 476 configured to monitor flow through slotted portion 468 and into the heap. One or more sensors 476 may be configured to monitor various flow conditions associated with the leaching solution through subsurface injector 462 to ensure that the target operational condition of the leaching solution is achieved and communicate a status of flow through subsurface injector 462. One or more sensors 476 may further be configured to monitor other characteristics of the solution, such as, for example, oxygen content. One or more sensors 476 may be distributed equally or unequally along a length of subsurface injector 462. For example, in various embodiments, the one or more sensors 476 may be spaced in approximately 5-foot, 10-foot, 15-foot, or 20-foot increments, however, the spacing is not limited in this regard and may be distributed in any manner along subsurface injector 462. Further, one or more sensors 476 may extend along any length of subsurface injector 462 such as an entire length of subsurface injector 462. The one or more sensors 476 may be coupled to a signal wire 478 which may extend along subsurface injector 462 and out of surface 466. Signal wire 478 may transmit information acquired by the one or more sensors 476 to the one or more leaching solution regulating systems. However, well monitoring design 460 is not limited in this regard and may wirelessly communicate information obtained by one or more sensors 476 to the one or more leaching solution regulating systems.

While described above in various embodiments as comprising a subsurface injector, the subsurface leaching solution distribution systems disclosed herein are not limited in this regard. For example, the subsurface leaching solution distribution systems disclosed herein may comprise any suitable structure and orientation configured to deliver leaching solution at a target operational condition beneath the surface of the heap. As such, the disclosed embodiments herein are not intended to be limiting to the structure and/or orientation of such subsurface leaching solution distribution systems. Further, while discussed herein with reference to subsurface systems, the present disclosure is not limited in this regard and may comprise above surface leaching solution distribution systems in addition to or instead of the subsurface leaching solution systems disclosed herein. For example, in various embodiments, above surface leaching techniques may be utilized followed by the subsurface leaching techniques in order to maximize leaching and/or recovery.

In operation, in accordance with various embodiments, a leaching solution regulating module, such as leaching solution regulating module 100, may observe a pressure and/or flow rate change. A pressure and/or flow change may be indicative of plugging of an orifice in the subsurface leaching solution distribution system. Data indicative of a pressure and/or flow rate change may be sent via a measurement transmitter to a gateway. The processor may receive the data indicative of a pressure and/or flow rate from the gateway and initiate a response. The processor may provide an alert in response to receiving data indicative of at least one of an abnormal pressure and/or flow rate and a low pressure and/or flow rate. An abnormal pressure and/or flow rate may be a pressure and/or flow rate that is outside a predetermined pressure and/or flow rate target value, which in various embodiments may be a range of pressures or flow rates. For example, the processor may send an email, an SMS message, and or other communication in response to the data that is indicative of a pressure and/or flow rate. For example, one may be dispatched to the particular area of the leaching solution distribution system to fix the plugged orifice. Upon correction, the leaching solution regulating module will continue to report a target pressure and/or flow rate.

Further, the leaching solution regulating module may regulate the flow of the leaching solution to achieve a desired flow condition best suited for a given leaching application, such as a leaching application for high-clay content or other impenetrable materials and deliver the leaching solution directly adjacent to deposits of desired metal values. Accordingly, the present disclosure may provide benefits over traditional surface leaching operations by delivering leaching solution directly adjacent to areas to be leached and provide benefits over existing subsurface leaching systems by maintaining target operational conditions.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions and methods may be made within the scope of the present invention, with substantially similar results. The subject matter of the inventions includes all novel and non-obvious combinations and subcombinations of the various elements, features, functions and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims of the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A method for recovering a metal from chalcopyrite, comprising:
 delivering a leaching solution from a leaching solution source to a leaching solution regulating system, wherein the leaching solution comprises a combination of an effective amount of citric acid and hydrogen peroxide, wherein the citric acid keeps iron in the leaching solution and allows the hydrogen peroxide to interact with the chalcopyrite;
 regulating a pressure, a mass flow rate and a volumetric flow rate of the leaching solution to achieve a target operational condition, wherein the target operational condition is selected to optimize a set of operational parameters to allow options of preventing plugging of a subsurface leaching distribution system, minimizing locking up of the leaching solution in the heap and maximizing recovery of the recoverable metal in the chalcopyrite;
 delivering the leaching solution at the target operational condition from the leaching solution regulating system to the subsurface leaching distribution system; and delivering the leaching solution at the target operational condition from the subsurface leaching distribution system to a location of the recoverable metal in the chalcopyrite under a surface of the heap to leach and recover the recoverable metal from the chalcopyrite.

2. The method of claim 1, wherein the leaching solution regulating system comprises a plurality of leaching solution regulating modules.

3. The method of claim 2, wherein each leaching solution regulating module comprises a meter configured to detect the pressure, the mass flow rate and the volumetric flow rate of the leaching solution.

4. The method of claim 2, wherein each leaching solution regulating module comprises a regulator configured to set the pressure, the mass flow rate and the volumetric flow rate of the leaching solution to the target operational condition.

5. The method of claim 1, further comprising determining an ore map for a heap to identify a location of the recoverable metal in the chalcopyrite in the heap.

6. The method of claim 1, wherein the set of operational parameters comprises at least one of minerology, chemistry, permeability or the recoverable metal.

7. The method of claim 1, further comprising transmitting the pressure, the mass flow rate and the volumetric flow rate of the leaching solution between the leaching solution regulating system and the subsurface leaching distribution system.

8. The method of claim 1, further comprising determining x,y,z coordinates for the location of the recoverable metal in the chalcopyrite in the heap.

9. The method of claim 1, wherein the effective amount of citric acid is about 1 g/L to about 10 g/L and wherein the effective amount of hydrogen peroxide is about 0.5% to about 10% by weight.

10. The method of claim 1, further comprising treating the location of the recoverable metal in the chalcopyrite to render the recoverable metal in the chalcopyrite susceptible to further leaching, wherein the treating comprises delivering a treatment solution to the location of the recoverable metal in the chalcopyrite, and wherein the treatment solution comprises the citric acid.

11. A system, comprising:
recoverable metal in chalcopyrite in a heap;
a leaching solution regulating system configured to detect and regulate a pressure, a mass flow rate and a volumetric flow rate of a leaching solution to a target operational condition, wherein the target operational condition is selected to optimize a set of operational parameters to allow options of preventing plugging of a subsurface leaching distribution system, minimizing locking up of the leaching solution in the heap and maximizing recovery of the recoverable metal in the chalcopyrite, and wherein the leaching solution comprises a combination of an effective amount of citric acid and hydrogen peroxide, wherein the citric acid keeps iron in the leaching solution and allows the hydrogen peroxide to interact with the chalcopyrite; and a subsurface leaching solution distribution system fluidly coupled to the leaching solution regulating system, the subsurface leaching solution distribution system comprising a subsurface injector configured to deliver the leaching solution to the recoverable metal in the chalcopyrite under the surface of the heap to leach and recover the recoverable metal in the chalcopyrite.

12. The system of claim 11, wherein the set of operational parameters comprises at least one of at least one of minerology, chemistry, permeability, and the recoverable metal.

13. The system of claim 11, wherein the effective amount of citric acid is about 1 g/L to about 10 g/L and wherein the effective amount of hydrogen peroxide is about 0.5% to about 10% by weight.

14. The system of claim 11, wherein the leaching solution regulating system transmits the pressure, the mass flow rate and the volumetric flow rate of the leaching solution between the leaching solution regulating system and the subsurface leaching distribution system.

15. The system of claim 11, wherein the heap also includes at least one of copper, nickel, zinc, silver, gold, germanium, lead, arsenic, antimony, chromium, molybdenum, rhenium, tungsten, iron, ruthenium, osmium, cobalt, rhodium, iridium, palladium, platinum, uranium, or rare earth metals.

16. The system of claim 11, wherein the subsurface injector is further configured to deliver a treatment solution to the at least one location of the recoverable metal in the chalcopyrite to render the at least one location susceptible to further leaching, wherein the treatment solution comprises citric acid.

17. The system of claim 11, wherein the subsurface injector is inserted into a bore formed in the heap, the bore filled with at least one material configured to provide stability and sealing for the subsurface injector.

18. The system of claim 11, further comprising a plurality of sensors distributed along a length of the subsurface injector.

19. The system of claim 11, further comprising an ore map determined by adding flow data, irrigation data and a remaining mineral prediction from a machine learning model to obtain information by section and by data for the heap.

20. The system of claim 19, wherein the at least one location of the recoverable metal in the chalcopyrite in the heap is in x,y,z coordinates of the heap.

* * * * *